United States Patent
Kugino et al.

(10) Patent No.: US 9,502,709 B2
(45) Date of Patent: Nov. 22, 2016

(54) TERMINAL STRUCTURE FOR SECONDARY BATTERY AND SECONDARY BATTERY

(71) Applicant: Shin-Kobe Electric Machinery Co., Ltd., Tokyo (JP)

(72) Inventors: Satoshi Kugino, Tokyo (JP); Yuichiro Mishiro, Tokyo (JP); Mitsumasa Nakano, Tokyo (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 125 days.

(21) Appl. No.: 14/415,008

(22) PCT Filed: Jul. 16, 2013

(86) PCT No.: PCT/JP2013/069316
§ 371 (c)(1),
(2) Date: Jan. 15, 2015

(87) PCT Pub. No.: WO2014/013993
PCT Pub. Date: Jan. 23, 2014

(65) Prior Publication Data
US 2015/0194659 A1    Jul. 9, 2015

(30) Foreign Application Priority Data
Jul. 17, 2012    (JP) ................. 2012-158875

(51) Int. Cl.
*H01M 2/30* (2006.01)
*H01M 2/26* (2006.01)
*H01M 2/06* (2006.01)

(52) U.S. Cl.
CPC ................. *H01M 2/30* (2013.01); *H01M 2/06* (2013.01); *H01M 2/266* (2013.01)

(58) Field of Classification Search
CPC ......... H01M 2/30; H01M 2/263; H01M 2/22
See application file for complete search history.

(56) References Cited

U.S. PATENT DOCUMENTS 6,027,831 A * 2/2000 Inoue ..................... H01M 2/06
429/161
2012/0028088 A1    2/2012 Hattori et al.

FOREIGN PATENT DOCUMENTS

| JP | 55-22971   | U1 | 2/1980  |
|----|------------|----|---------|
| JP | 58-113268  | U1 | 8/1983  |
| JP | 1-255164   | A  | 10/1989 |
| JP | 10-188944  | A  | 7/1998  |
| JP | 2009-87612 | A  | 4/2009  |
| JP | 4494731    | B2 | 6/2010  |
| JP | 2012-33334 | A  | 2/2012  |
| JP | 2012-99317 | A  | 5/2012  |

* cited by examiner

*Primary Examiner* — Stewart Fraser
*Assistant Examiner* — Olatunji Godo
(74) *Attorney, Agent, or Firm* — Fitch, Even, Tabin & Flannery, LLP

(57) ABSTRACT

A secondary battery in which the contact resistance is not increased even if the number of housed electrodes is increased is provided. Two screw holes 11*d* are formed in an opposed surface 11*c* of a terminal body portion 11*b* of a positive terminal 11 that faces the stacking direction. A projecting surface 11*e* is provided between the two screw holes 11*d* to project toward a positive pressing member 25 with respect to portions provided with the screw holes 11*d*. The projecting surface 11*e* projects toward the positive pressing member 25 by 0.2 mm with respect to the portions provided with the two screw holes 11*d*.

14 Claims, 7 Drawing Sheets

TERMINAL STRUCTURE FOR SECONDARY BATTERY AND SECONDARY BATTERY

TECHNICAL FIELD

The present invention relates to a terminal structure for a secondary battery, and to a secondary battery.

BACKGROUND ART

Non-aqueous electrolyte secondary batteries such as lithium-ion batteries advantageously have a high energy density, a low self-discharge rate, and good cycle performance. Therefore, in recent years, it has been expected to increase the size or the capacity of the non-aqueous electrolyte secondary batteries to use such secondary batteries as power sources for various types of industrial machinery and tools. In some non-aqueous electrolyte secondary batteries, the number of electrodes housed in the non-aqueous electrolyte secondary battery is increased in order to increase the capacity of the non-aqueous electrolyte secondary battery.

It is necessary to electrically connect the electrodes to an electrode terminal. Therefore, if it is attempted to connect the electrodes to an electrode terminal in a non-aqueous electrolyte secondary battery in which an increased number of electrodes are housed, the electrode terminal must be increased in size to secure a region for connection to the electrodes. In addition, a space for connection of a large number of electrodes is necessary around the terminal. Therefore, the non-aqueous electrolyte secondary battery may be increased in size. Japanese Patent No. 4494731 (Patent Document 1) discloses a secondary battery in which tabs of five electrodes are welded to each current collecting lead (current collecting plate) and a plurality of such current collecting leads are disposed to overlap each other to be bolted and welded to an electrode in order to reduce the number of members directly connected to the electrode.

RELATED-ART DOCUMENT

Patent Document

Patent Document 1: Japanese Patent No. 4494731

SUMMARY OF INVENTION

Technical Problem

With the structure of the secondary battery according to Patent Document 1, the current collecting plates closely contact each other at a position close to the bolt screwed into a nut. However, the degree of closeness of the contact between the current collecting plates is reduced as the current collecting plates extend away from the bolt. Therefore, the contact resistance between the current collecting plates and the contact resistance between the current collecting plate and a terminal portion is large in a region located away from the bolt. Therefore, if the terminal structure taught in Patent Document 1 is applied to a secondary battery with a large discharge current, the temperature of the terminal portion may become significantly high.

These days, there are secondary batteries with a maximum discharge current of up to 100 A. In such secondary batteries, several hundreds of electrodes may be stacked to constitute an electrode group, and the number of current collecting plates that connect the tabs of the electrodes is also inevitably increased. If the number of stacked current collecting plates is increased, the secondary battery may be ignited because of an increase in amount of generated heat due to an increase in contact resistance between the current collecting plates, which may reduce the safety of the secondary battery.

An object of the present invention is to provide a terminal structure for a secondary battery in which the contact resistance between stacked current collecting plates is small compared to the related art.

Another object of the present invention is to provide a terminal structure for a secondary battery in which the amount of generated heat is not significantly increased even if the number of connected electrodes is increased.

Solution to Problem

The present invention improves a terminal structure for a secondary battery including an electrode group including a plurality of electrodes each having a tab and stacked via a separator. The terminal structure according to the present invention includes a terminal including a terminal portion and a terminal body portion, a stacked current collecting plate group, two or more fasteners, and at least one pressing member. The stacked current collecting plate group is formed by stacking a plurality of current collecting plates to which the tabs of the electrodes of the same polarity are welded. In the present invention, the pressing member is attached to the terminal body portion using two or more fasteners, and configured to hold the stacked current collecting plate group in a sandwiched manner between the terminal body portion of the terminal and the pressing member. The two or more fasteners each include a bolt extending in a stacking direction of the current collecting plates in the stacked current collecting plate group, and a nut. Herein, the bolt is structured such that: one end is fixed and a threaded portion to be engaged with the nut is formed at the other end; the nut is fixed to one end and a threaded portion is formed at the other end; or threaded portions are formed at both ends. Herein, the nut is not limited to a discrete component to be engaged with the threaded portion of the bolt, and may be structured as a female thread portion formed in the terminal body portion. The fasteners used in the present invention are provided such that one or more of the fasteners are located in each of two attachment regions spaced apart at a predetermined interval. Here, the term "attachment region" means a virtual space region in which the bolt and the nut are screwed to each other. The terminal body portion has at least one opposed surface of the terminal body portion that faces the pressing member. The pressing member has an opposed surface of the pressing member that faces the terminal body portion. In the present invention, at least one of the opposed surface of the terminal body portion and the opposed surface of the pressing member has a projecting surface to project toward the other of the opposed surfaces of the terminal body portion and the pressing member. The projecting surface is formed in a region located between the two attachment regions. According to the present invention, when the pressing member is moved toward the terminal body portion using the fasteners provided in the two attachment regions located on both sides of the projecting surface, both end portions of the pressing member located on both sides of the projecting surface are deformed by an amount corresponding to the projecting length of the projecting surface. Because of the deformation, the center portion of the pressing member facing the projecting surface via the stacked current collecting plate group is caused to strongly contact the stacked current collecting plate group over substantially the entire portion. As a result, according to the present invention, the contact resistance between the two adjacent current collecting plates in the stacked current collecting plate group and the contact resistance between the stacked current collecting plate group and the pressing member can be significantly reduced compared to the related art to significantly reduce the amount of heat generated by the terminal structure, to a greater degree than in a configuration in which the stacked current collecting plate group is simply held in a sandwiched manner between the terminal body portion and the pressing member.

The projecting surface may be provided on one of the opposed surfaces of the terminal body portion and the pressing member. In this case, the projecting length of the projecting surface from a non-projecting surface of the one of the opposed surfaces of the terminal body portion and the pressing member is preferably 0.1 mm to 0.5 mm. If the projecting length of the projecting surface is less than 0.1 mm, the effect of providing the projecting surface may be hardly obtained depending on the number of the current collecting plates. If the projecting length of the projecting surface is more than 0.5 mm, meanwhile, a portion of a pressing plate facing the projecting surface may be curved outward to reduce the effect in reducing the contact resistance depending on the number of the current collecting plates. If the projecting length of the projecting surface is within such a numerical range, the amount of generated heat can be reduced by 20% or more compared to a case where the projecting surface is not provided.

The projecting surface is preferably a continuous surface. If the projecting surface is a continuous surface, the contact resistance can be further reduced. As a matter of course, the projecting surface may also be discontinuous. The projecting surface preferably has an area that is 60% to 80% of an area of the opposed surfaces of the terminal body portion and the pressing member.

Base portions of the bolts of the fasteners may be fixed to one of the terminal body portion and the pressing member, and the other of the terminal body portion and the pressing member may be formed with through holes through which the bolts pass. In this case, the nuts are screwed to threaded portions of the bolts projecting from the through holes. With such a configuration, the pressing member and the terminal body portion can be positioned by inserting the bolts into the through holes. Thus, the terminal structure for a secondary battery can be easily formed.

Alternatively, the pressing members may each be formed with through holes through which the bolts pass, and the terminal body portion may be formed with hole portions in which female threads are formed to function as the nuts when the threaded portions of the bolts are screwed into the hole portions. With such a configuration, the terminal body portion can be used as the nuts. Therefore, the bolts can be easily attached to the terminal body portion by simply inserting male thread portions at the distal end of the bolts into female thread portions formed in the terminal body portion and rotating the bolts.

Still alternatively, the current collecting plates may each be formed with through holes through which the bolts pass. With this configuration, the stacked current collecting plate group can be easily positioned.

In order to electrically connect a larger number of electrodes to the terminal portion, stacked current collecting plate groups may be respectively attached to two surfaces of the terminal body portion. Specifically, the at least one opposed surface of the terminal body portion comprises the two opposed surfaces of the terminal body portion that are opposite to each other in the stacking direction, and the at least one pressing member comprises two pressing members respectively provided to face the two opposed surfaces of the terminal body portion. In this case, a predetermined number of the plurality of tabs of the plurality of electrodes of the same polarity in the electrode group are welded to each of the plurality of current collecting plates. The plurality of current collecting plates are divided into two groups and stacked to constitute two stacked current collecting plate groups. One of the stacked current collecting plate groups is held in a sandwiched manner between one of the opposed surfaces of the terminal body portion and one of the pressing members. The remaining one of the stacked current collecting plate groups is held in a sandwiched manner between the remaining one of the opposed surfaces of the terminal body portion and the remaining one of the pressing members. With such a configuration, the stacked current collecting plate groups can be respectively held on the two surfaces of the terminal body portion that are opposite to each other in the stacking direction, which makes it possible to support an increase in number of electrodes.

If the stacked current collecting plate groups are divided and connected to the two surfaces, the terminal body portion is formed with a plurality of through holes that each open in the two opposed surfaces of the terminal body portion. In addition, the two pressing members are each formed with a plurality of through holes aligned with the plurality of through holes formed in the terminal body portion. The bolts having threaded portions at both ends are disposed to pass through the through holes formed in the terminal body portion and the through holes formed in the pressing members, and the nuts are screwed with both ends of the bolts. With such a configuration, the two pressing members can be easily attached to the terminal body portion by simply screwing the nuts from both sides.

Normal bolts having a threaded portion at one end portion may be used in place of the bolts having threaded portions at both ends. In this case, the bolts having a threaded portion at an end portion are disposed to pass through the through holes formed in the terminal body portion and the through holes formed in the pressing members. Base portions of the bolts contact one of the pressing members. The nuts contact the remaining one of the pressing members. With such a configuration, the number of the nuts to be screwed can be reduced, which further simplifies attachment of the pressing members.

The at least one pressing member may be formed from aluminum, titanium, iron, nickel, copper, zinc, silver, cadmium, or tin, and preferably have a thickness of 5 mm to 7 mm in the stacking direction. With such a configuration, sufficient rigidity of the pressing member can be secured, and the pressing member can be deformed along the stacked current collecting plate group.

The projecting surface may be formed on the at least one pressing member. If the projecting surface is formed on the pressing member, the existing terminal portion can be utilized. Thus, the secondary battery can be manufactured at a low cost.

The at least one pressing member, the stacked current collecting plate groups, and the terminal portion may be welded to each other. With this configuration, a current can also flow through a welded portion, which further reduces the contact resistance.

The present invention can also be implemented for non-aqueous electrolyte secondary batteries.

DESCRIPTION OF EMBODIMENTS

Figure 1:
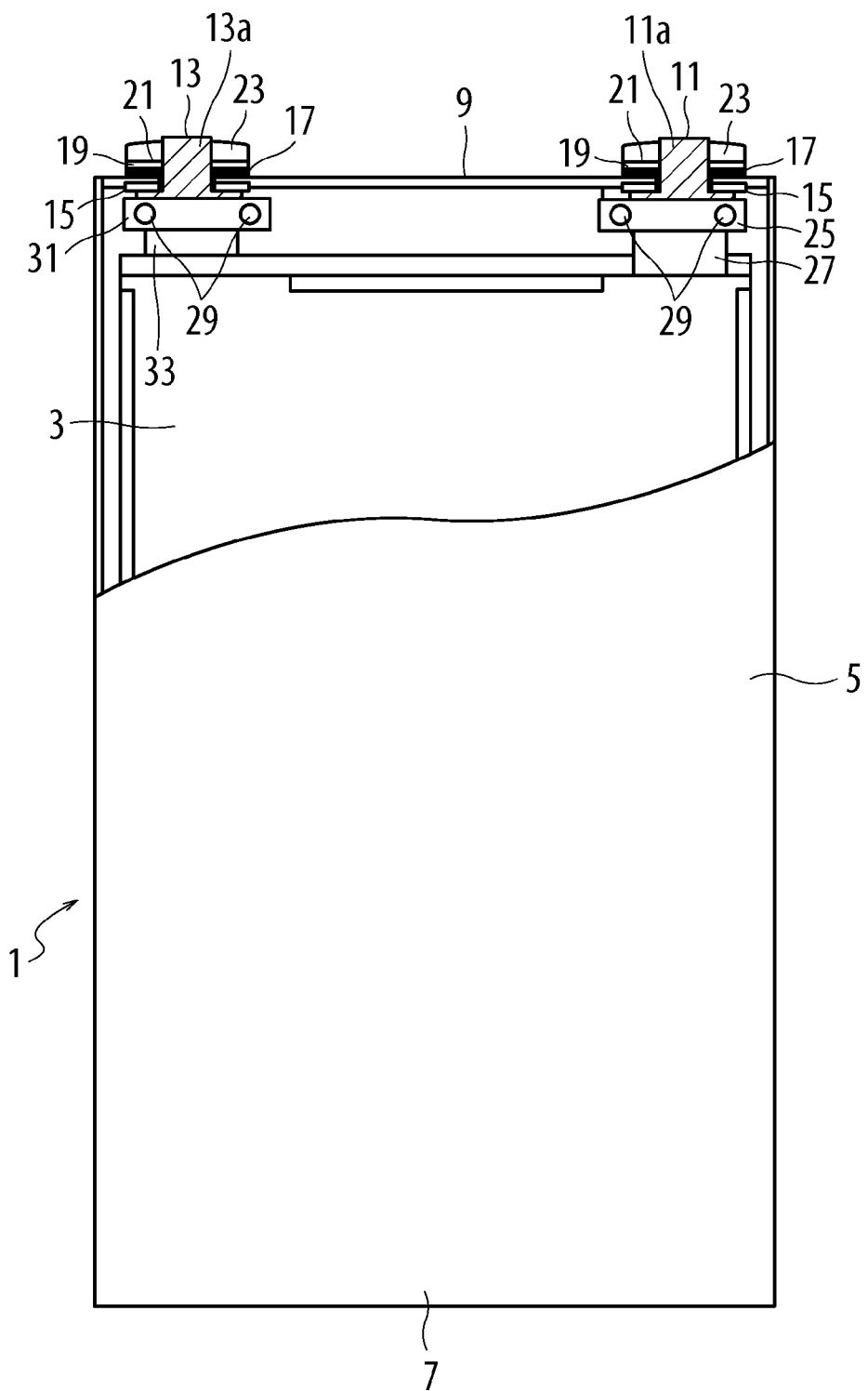
FIG. 1 is a partially cut-away front view of a lithium-ion secondary battery as a non-aqueous electrolyte secondary battery according to a first embodiment of the present invention.

The configuration of a terminal structure and a secondary battery according to an embodiment of the present invention will be described in detail below with reference to the drawings. FIG. 1 is a partially cut-away front view of a lithium-ion secondary battery 1 as a non-aqueous electrolyte secondary battery to which a terminal structure according to a first embodiment of the present invention is applied. In the embodiment, in order to facilitate understanding, some components are depicted with exaggeration in terms of thicknesses, and the number of electrodes is reduced compared to the actual number.

As illustrated in FIG. 1, the lithium-ion secondary battery 1 according to the embodiment includes an electrode group 3 and a rectangular battery container 5 made of stainless steel and configured to house the electrode group 3 therein. The battery container 5 includes a battery case 7 having an opening at one end portion, and a battery lid 9. After the electrode group 3 is inserted into the battery case 7, the peripheral portion of the opening of the battery case 7 and the peripheral portion of the battery lid 9 are welded to each other to tightly close the battery container 5.

A positive terminal 11 and a negative terminal 13 made of aluminum are fixed to the battery lid 9. The positive terminal 11 and the negative terminal 13 have terminal portions 11a and 13a that project out of the battery container 5 through the lid plate of the battery lid 9, and terminal body portions 11b and 13b disposed in the battery container 5, respectively. An annular inner packing 15 is provided between each of the positive terminal 11 and the negative terminal 13 and the battery lid 9. An annular outer packing 17, a flat washer 19, and a toothed washer 21 are provided in an overlapping manner on the outer side of the battery lid 9 at positions opposite to the inner packings 15 via the battery lid 9. The positive terminal 11 and the negative terminal 13 are fixed to the battery lid 9 by nuts 23 provided at the distal end of a threaded portion via the inner packing 15, the outer packing 17, the flat washer 19, and the toothed washer 21. The inner packings 15 and the outer packings 17 are provided at portions of the battery lid 9 provided with the positive terminal 11 and the negative terminal 13 to secure a tightly sealed state of a space in the battery container 5.

A positive pressing member 25 and a stacked positive current collecting plate group 27 are attached to the terminal body portion 11b of the positive terminal 11 by bolts 29. Meanwhile, a negative pressing member 31 and a stacked negative current collecting plate group 33 are attached to the terminal body portion 13b of the negative terminal 13 by bolts 29.

Figure 2:
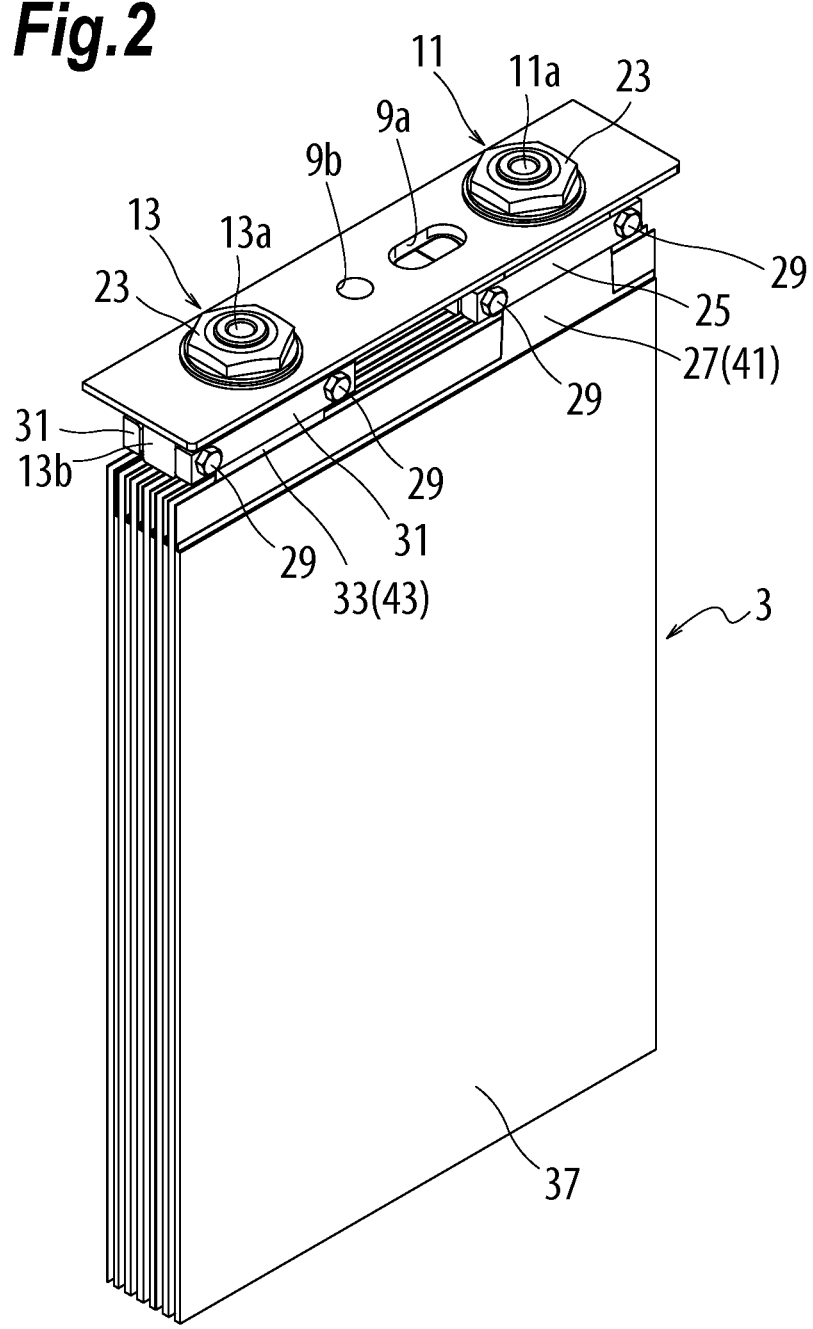
FIG. 2 is a perspective view of the lithium-ion secondary battery with a battery case removed.
Figure 3:
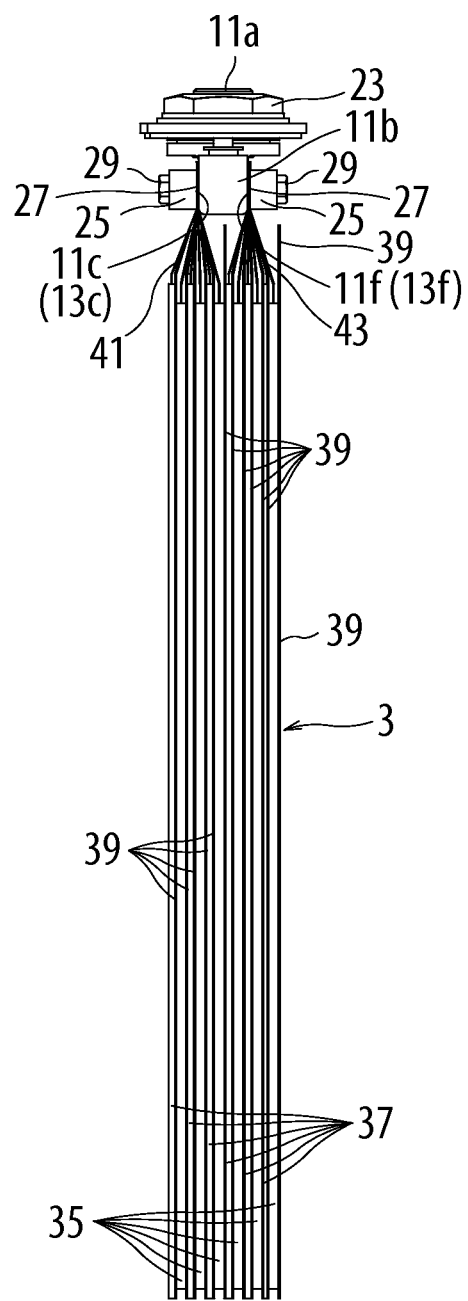
FIG. 3 is a right side view of the lithium-ion secondary battery with the battery case removed.

FIG. 2 is a perspective view of the lithium-ion secondary battery 1 with the battery case 7 removed. FIG. 3 is a right side view of the lithium-ion secondary battery 1 with the battery case 7 removed. In FIGS. 2 and 3, in order to facilitate understanding, the components are schematically illustrated. Therefore, the components illustrated in FIGS. 2 and 3 differ in shape, dimension, etc. from the actual components of the electrode group.

A gas discharge valve 9a to which a stainless steel foil has been welded and liquid injection ports 9b are disposed in the battery lid 9. The gas discharge valve 9a has a function of discharging a gas inside the battery when the internal pressure of the battery is raised to crack the stainless steel foil. A non-aqueous electrolyte (not illustrated) prepared by dissolving lithium phosphate hexafluoride ($LiPF_6$) or lithium tetrafluoroborate ($LiBF_4$) in a mixed solvent of ethylene carbonate and dimethyl carbonate is injected from the liquid injection ports 9b. After the electrolyte is injected, the liquid injection ports 9b are tightly closed by liquid port plugs.

The electrode group 3 is constituted by alternately stacking a plurality of positive electrodes 35 and a plurality of negative electrodes 37 via separators 39. The separators 39 prevent the positive electrodes 35 and the negative electrodes 37 from contacting each other to cause a short circuit.

The positive electrode 35 includes a positive current collector formed from an aluminum foil formed in a substantially rectangular plate shape, and positive active material layers provided on both surfaces of the positive current collector. The positive active material layers are formed by preparing slurry by mixing powder of a lithium manganese double oxide, flake graphite as a conducting agent, and polyvinylidene fluoride (PVDF) as a binding agent at a weight ratio of 85:10:5, for example, adding N-methylpyrrolidone as a dispersion solvent to the mixture, and kneading the mixture, applying the slurry to the positive current collector, and thereafter drying and pressing the positive current collector. A positive tab 35a is integrally formed on a side of the positive current collector extending along the battery lid 9. The positive tab 35a is joined to a positive current collecting plate to be discussed later by ultrasonic welding or laser welding.

The negative electrode 37 includes a negative current collector formed from an electrolytic copper foil formed in a substantially rectangular plate shape, and negative active material layers provided on both surfaces of the negative current collector. The active material layers are formed by preparing slurry by adding 10 parts by mass of PVDF as a binding agent to 90 parts by mass of powder of amorphous carbon as a negative active material, for example, adding NMP as a dispersion solvent to the mixture, and kneading the mixture, applying the slurry to both surfaces of an electrolytic copper foil with a thickness of 10 μm, and thereafter drying and pressing the electrolytic copper foil. A negative tab 37a is integrally formed on a side of the negative current collector extending along the battery lid 9. The negative tab 37a is formed not to face the positive tab 35a when the positive electrodes 35 and the negative electrodes 37 are stacked. The negative tab 37a is joined to a negative current collecting plate to be discussed later by ultrasonic welding or laser welding.

The separators 39 are formed in a substantially rectangular sheet shape from a porous material made of polyethylene that enables passage of lithium ions. The separators 39 are sized to hinder contact between the positive current collectors of the positive electrodes 35 and the negative current collectors of the negative electrodes 37 in a stacked state.

In FIGS. 2 and 3, in order to facilitate illustration, only six positive electrodes, six negative electrodes, and twelve separators are illustrated. In FIGS. 2 and 3, in addition, in order to facilitate illustration, one positive electrode and one negative electrode are illustrated as being welded to each positive current collecting plate and each negative current collecting plate, respectively. In practice, however, the positive tabs of the plurality of positive electrodes and the negative tabs of the plurality of negative electrodes are welded to each positive current collecting plate and each negative current collecting plate, respectively, as illustrated in FIG. 4.

Figure 4:
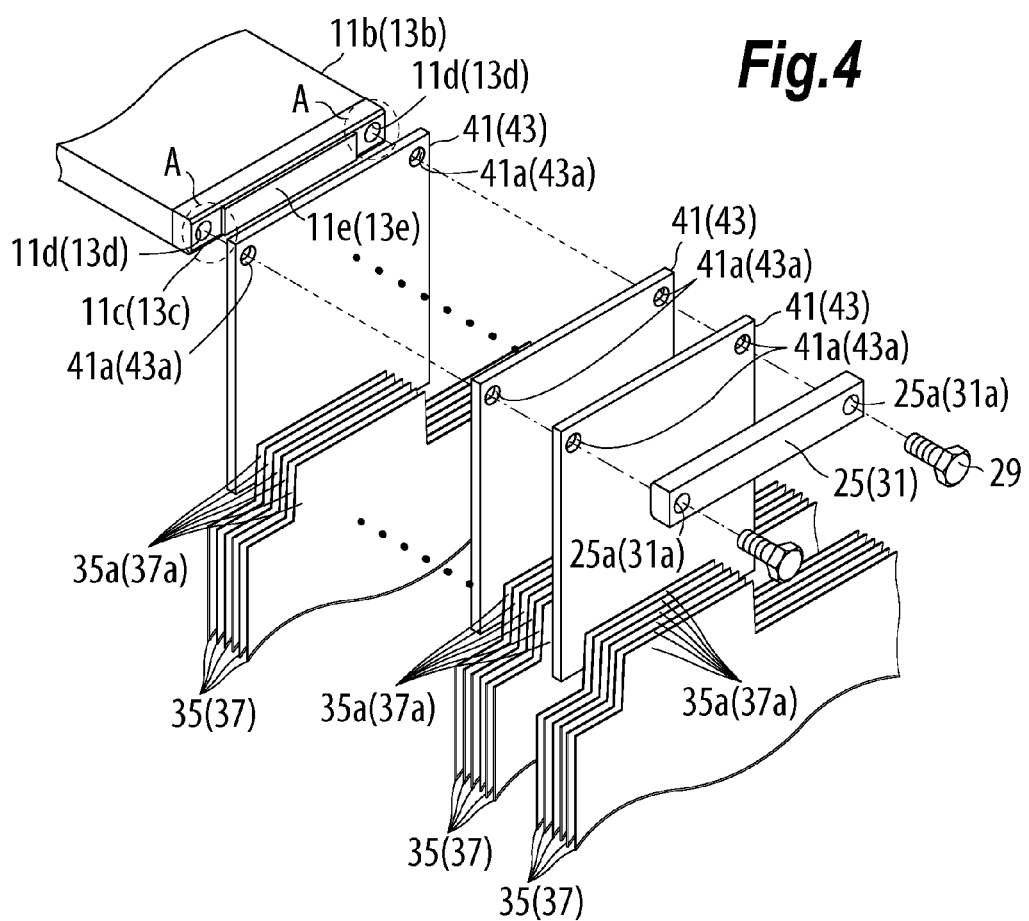
FIG. 4 illustrates tabs of electrodes, current collecting plates, a terminal body portion, and bolts as disassembled.

FIG. 4 illustrates the positive tabs 35a of the positive electrodes, positive current collecting plates 41, the terminal body portion 11b, and the bolts 29 of the non-aqueous electrolyte secondary battery according to the embodiment as disassembled. Six positive tabs 35a are welded to each positive current collecting plate 41 by ultrasonic welding. In FIG. 4, the separators and the negative electrodes are not illustrated. In the embodiment, similarly, six negative tabs 37a are welded to each negative current collecting plate 43 by ultrasonic welding or laser welding.

The positive current collecting plate 41 is formed from aluminum in a substantially rectangular parallelepiped shape with a thickness of 20 μm. In the embodiment, the positive current collecting plate 41 is formed with two through holes 41a through which the bolts 29 pass and which are located around both end portions of a portion of the positive current collecting plates 41 to be held in a sandwiched manner between the terminal body portion 11b of the positive terminal 11 and the positive pressing member 25. A plurality of such positive current collecting plates are stacked to constitute the stacked positive current collecting plate group 27. In the embodiment, as illustrated in FIGS. 2 and 3, the plurality of positive current collecting plates 41 are divided into two groups to constitute two stacked positive current collecting plate groups 27.

The negative current collecting plate 43 is formed from nickel in a substantially rectangular parallelepiped shape with a thickness of 10 μm. In the embodiment, the negative current collecting plate 43 is formed with two through holes 43a through which the bolts 29 pass and which are located around both end portions of a portion of the negative current collecting plate 43 to be held in a sandwiched manner between the terminal body portion 13b of the negative terminal 13 and the negative pressing member 31. A plurality of such negative current collecting plates 43 are stacked to constitute the stacked negative current collecting plate group 33. In the embodiment, the plurality of negative current collecting plates 43 are divided into two groups to constitute two stacked negative current collecting plate groups 33.

The positive pressing member 25 is formed from aluminum in a substantially rectangular parallelepiped shape. The positive pressing member 25 is formed with two through holes 25a through which the bolts 29 pass and which are located around both end portions of the positive pressing member 25 in the longitudinal direction. The positive pressing member 25 is attached to the terminal body portion 11b of the positive terminal 11 with the stacked positive current collecting plate groups 27 held in a sandwiched manner between the terminal body portion 11b and the positive pressing member 25.

The negative pressing member 31 is formed from copper in a substantially rectangular parallelepiped shape. The negative pressing member 31 is formed with two through holes 31a through which the bolts 29 pass and which are formed around both end portions of the negative pressing member 31 in the longitudinal direction. The negative pressing member 31 is attached to the terminal body portion 13b of the negative terminal 13 with the stacked negative current collecting plate groups 33 held in a sandwiched manner between the terminal body portion 13b and the negative pressing member 31.

Figure 5A:
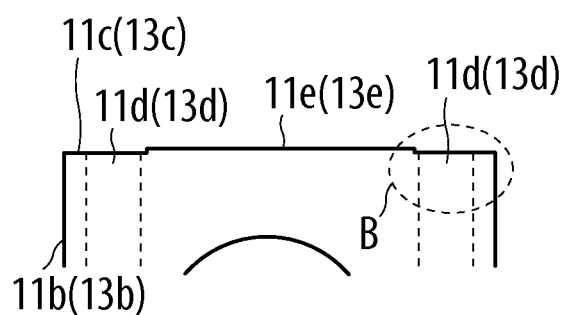
FIG. 5A illustrates a projecting surface of a terminal body portion of a positive terminal as seen from the battery lid side.
Figure 5B:
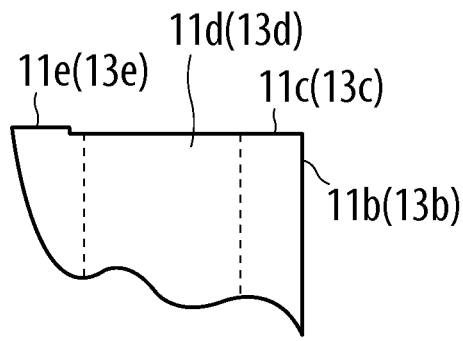
FIG. 5B is an enlarged view of an encircled region of FIG. 5A indicated by a symbol B.

In the terminal body portion 11b of the positive terminal 11, two screw holes 11d to which the bolts 29 are to be fastened are formed in a surface 11c facing the stacking direction. The screw holes 11d are formed around both end portions of the surface 11c in the longitudinal direction. Female threads to be engaged with a threaded portion provided at the distal end of the bolts 29 are formed inside the screw holes 11d. Thus, in the embodiment, the terminal body portion 11b functions as nuts of fasteners. The surface 11c is sized to perfectly match the positive pressing member 25. The surface 11c serves as an opposed surface of the terminal body portion 11b for the positive electrode. A surface of the positive pressing member 25 facing the surface 11c serves as an opposed surface 25b of the pressing member for the positive electrode. A projecting surface 11e is provided between the two screw holes 11d to project toward the positive pressing member 25 with respect to portions provided with the screw holes 11d. The projecting surface 11e projects toward the positive pressing member 25 by 0.2 mm with respect to the portions provided with the two screw holes 11d. FIG. 5A illustrates the projecting surface 11e of the terminal body portion 11b of the positive terminal 11 as seen from the battery lid 9 side. FIG. 5B is an enlarged view of an encircled region of FIG. 5A indicated by a symbol B.

In the terminal body portion 11b according to the embodiment, in particular, a surface 11f of the terminal body portion 11b that is opposite to the surface 11c in the stacking direction is also formed with screw holes 11d and a projecting surface 11e. That is, the terminal body portion 11b according to the embodiment has two opposed surfaces. In the embodiment, the two stacked positive current collecting plate groups 27 are respectively attached to the two opposed surfaces 11c and 11f of the terminal body portion 11b using the positive pressing members 25 and the fasteners (the bolts 29 and nuts 13d).

In the embodiment, two virtual space regions A (FIG. 4) in which the bolts 29 and the nuts 13d are screwed to each other constitute attachment regions.

In the terminal body portion 13b of the negative terminal 13, as in the terminal body portion 11b of the positive terminal 11, two surfaces 13c and 13f that are opposite to each other in the stacking direction are each formed with two screw holes 13d to which the bolts 29 are to be fastened and a projecting surface 13e. Female threads are also formed inside the screw holes 13d. The surfaces 13c and 13f are sized to perfectly match the negative pressing member 31. The surfaces 13c and 13f serve as opposed surfaces of the terminal body portion 13b for the negative electrode. A surface of the negative pressing member 31 facing the surface 13c or 13f serves as an opposed surface 31b of the pressing member for the negative electrode.

The two stacked positive current collecting plate groups 27 are respectively attached to the surfaces 11c and 11f of the positive terminal 11 by the bolts 29 as pressed by the positive pressing members 25. Specifically, the bolts 29 are caused to pass through the through holes 41a of the positive current collecting plates 41 constituting the stacked positive current collecting plate groups 27 and the through holes 25a of the positive pressing members 25. Then, threaded portions provided at the distal end of the bolts 29 are engaged with female threads of the screw holes 11d formed in the terminal body portion 11b of the positive terminal 11. In addition, as with the stacked positive current collecting plate groups 27, the two stacked negative current collecting plate groups 33 are attached to the surfaces 13c and 13f of the negative terminal 13 by the bolts 29 as pressed by the negative pressing members 31.

Figure 6:
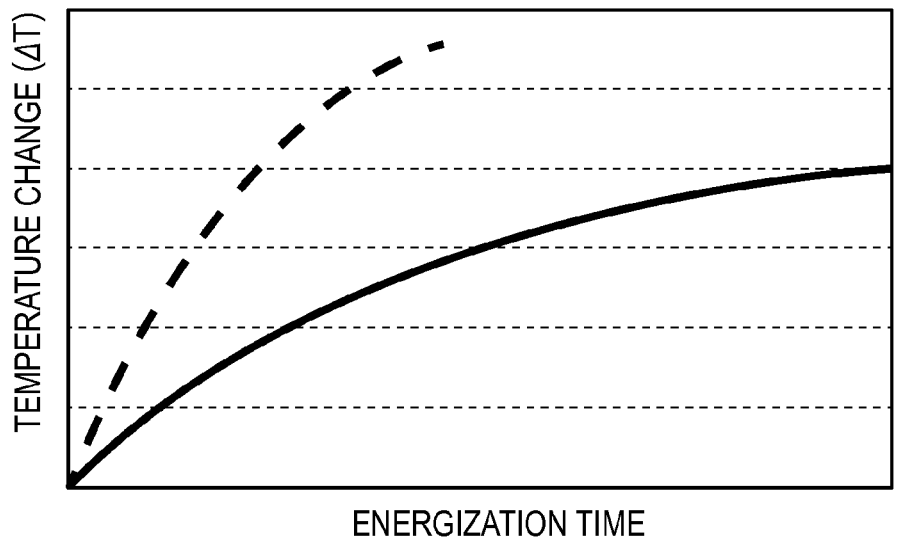
FIG. 6 is a graph illustrating the results of an experiment for measuring the amount of variations in temperature (temperature change) along with the energization time.

An experiment for measuring the amount of variations in temperature along with the energization time was performed on a lithium-ion secondary battery according to the related art in which the terminal body portions 11b and 13b are not provided with the projecting surfaces 11e and 13e, respectively, and a lithium-ion secondary battery with the terminal structure according to the embodiment. FIG. 6 is a graph in which the experiment result for the lithium-ion battery according to the related art is indicated by a broken line and the experiment result for the lithium-ion battery according to the embodiment is indicated by a solid line. With the lithium-ion battery according to the embodiment, as illustrated in FIG. 6, it was found that temperature variations were suppressed by 40% or more compared to the lithium-ion battery according to the related art. For the lithium-ion battery according to the related art, energization was stopped in the middle of the experiment because the amount of variations in temperature became too large during the experiment to ensure the safety of the lithium-ion battery. Therefore, in FIG. 6, the experiment result for the lithium-ion battery according to the related art is indicated only for a period until the middle.

Figure 7:
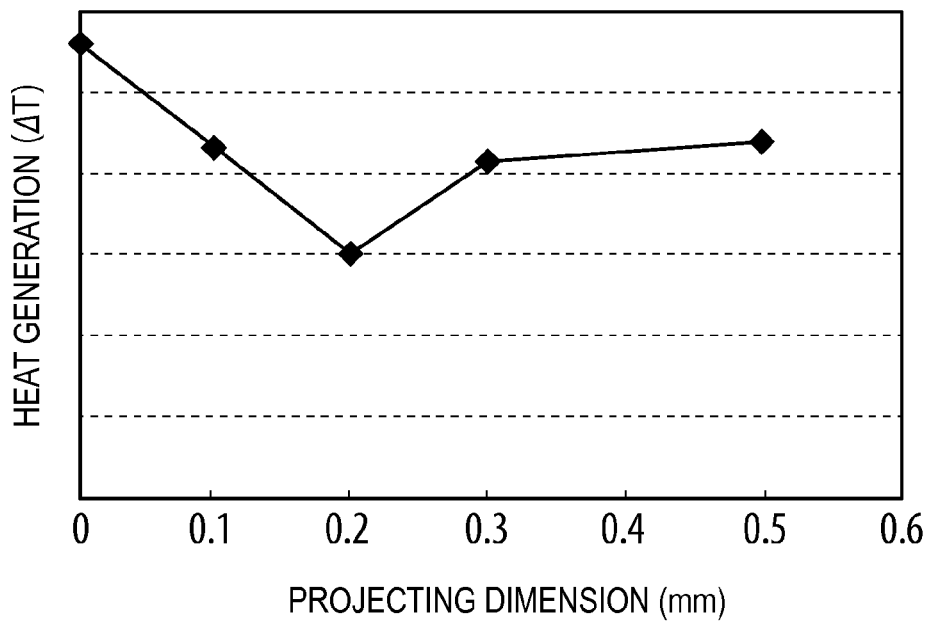
FIG. 7 is a graph illustrating the amount of generated heat (heat generation) with the projecting length (projecting dimension) varied.

Next, an experiment for measuring variations in amount of generated heat with the projecting length of the projecting surface varied by 0.1 mm at a time was performed for the lithium-ion secondary battery according to the embodiment. FIG. 7 is a graph illustrating the amount of generated heat with the projecting length varied by 0.1 mm at a time. As illustrated in FIG. 7, when the projecting length of the projecting surface was varied from 0.1 mm to 0.5 mm, the amount of generated heat was suppressed by 20% or more.

Figure 8:
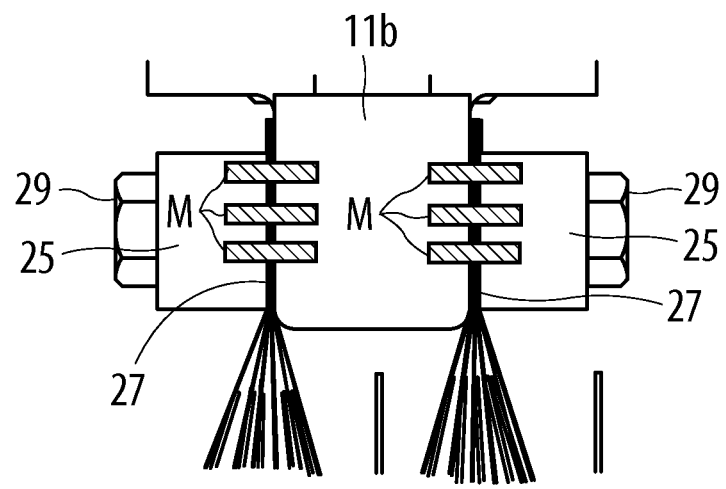
FIG. 8 illustrates a state in which positive pressing members, stacked positive current collecting plate groups, and a positive terminal are welded to each other by laser welding.

FIG. 8 illustrates a state in which the positive pressing members 25, the stacked positive current collecting plate groups 27, and the positive terminal 11 according to the embodiment are welded to each other by laser welding. Welded portions M are formed by laser welding on the side surface of the positive pressing members 25, the stacked positive current collecting plate groups 27, and the positive terminal 11. The negative pressing members 31, the stacked negative current collecting plate groups 33, and the negative terminal 13 are also welded to each other by laser welding. If laser welding was performed as illustrated in FIG. 8, the amount of generated heat was further reduced.

Figure 9:
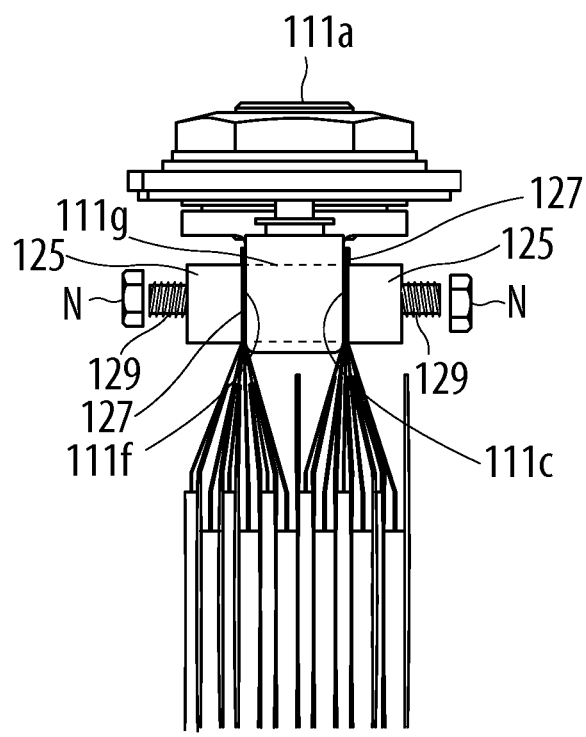
FIG. 9 is an enlarged view of a terminal structure for a non-aqueous electrolyte secondary battery according to a second embodiment.

FIG. 9 is an enlarged view of a terminal structure for a non-aqueous electrolyte secondary battery according to a second embodiment. In the second embodiment, members that are similar to those in the first embodiment are denoted by reference numerals obtained by adding 100 to the reference numerals affixed to their counterparts in FIGS. 1 to 7 to omit descriptions. In the second embodiment, a terminal body portion 111b is provided with a through hole 111g that opens in a surface 111c and a surface 111f. A bolt 129 having threaded portions at both ends is fixed to pass through the through hole 111g. Nuts N are engaged with the threaded portions at both ends of the bolt 129 with positive pressing members 125 and stacked positive current collecting plate groups 127 held in a sandwiched manner. In addition, a bolt 129 is fixed to pass through a through hole 113g formed in a terminal body portion 113b of the negative terminal.

In the lithium-ion secondary battery according to each of the embodiments described above, the stacked current collecting plate groups and the pressing members are formed with through holes. However, the present invention is not limited thereto, and it is a matter of course that the present invention may also be applied to stacked current collecting plate groups and pressing members not formed with through holes. In this case, for example, base portions of the bolts may be fixed to the pressing members, and the stacked current collecting plate groups may be located between the bolts and held by the pressing members to be fixed to the terminal.

In each of the embodiments described above, the stacked current collecting plate groups are held on two surfaces of the terminal body portion that are opposite to each other in the stacking direction. As a matter of course, however, the stacked current collecting plate group may be held on only one of the surfaces.

In each of the embodiments described above, the projecting surface is formed on the opposed surface of the terminal body portion. However, the projecting surface may be formed on the opposed surface of the pressing member.

While lithium-ion secondary batteries are described in each of the embodiments described above, the present invention is not limited thereto, and may be applied to other secondary batteries and terminal structures for such secondary batteries as a matter of course.

INDUSTRIAL APPLICABILITY

According to the present invention, at least one of the opposed surface of the terminal body portion and the opposed surface of the pressing member has a projecting surface to project toward the other of the opposed surfaces of the terminal body portion and the pressing member in a region located between the two attachment regions. Thus, the contact resistance between the terminal body portion and the stacked current collecting plate groups, the contact resistance between the two adjacent current collecting plates in the stacked current collecting plate groups, and the contact resistance between the stacked current collecting plate groups and the pressing members can be significantly reduced compared to the related art to significantly reduce the amount of heat generated by the terminal structure, to a greater degree than in a configuration in which the stacked current collecting plate groups are simply held in a sandwiched manner between the terminal body portion and the pressing members.

DESCRIPTION OF REFERENCE NUMERALS 1 lithium-ion secondary battery
3 electrode group
5 battery container
7 battery case
9 battery lid
9a gas discharge valve
11 positive terminal
11a threaded portion
11b terminal body portion
13 negative terminal
13b terminal body portion
15 inner packing
17 outer packing
19 flat washer
21 washer
23 nut
25 positive pressing member
27 stacked positive current collecting plate group
29 bolt
31 negative pressing member
33 stacked negative current collecting plate group
35 positive electrode
35a positive tab
37 negative electrode
37a negative tab
39 separator
41 positive current collecting plate
43 negative current collecting plate

The invention claimed is:

1. A terminal structure for a secondary battery including an electrode group including a plurality of electrodes each having a tab and stacked via a separator, the terminal structure comprising:
a terminal including a terminal portion and a terminal body portion; and
at least one pressing member attached to the terminal body portion using two or more fasteners each including a bolt and a nut, and configured to hold a stacked current collecting plate group in a sandwiched manner between the pressing member and the terminal body portion, the stacked current collecting plate group being formed by stacking a plurality of current collecting plates to which the tabs of the electrodes of the same polarity are welded, wherein:
the two or more fasteners are provided such that the bolts extend in a stacking direction of the current collecting plates in the stacked current collecting plate group and one or more of the fasteners are located in each of two attachment regions spaced apart at a predetermined interval;
the terminal body portion has at least one opposed surface that faces the pressing member;
the pressing member has an opposed surface that faces the terminal body portion; and
at least one of the opposed surface of the terminal body portion and the opposed surface of the pressing member has a projecting surface to project toward the other of the opposed surfaces of the terminal body portion and the pressing member in a region located between the two attachment regions. a terminal including a terminal portion and a terminal body portion;
the projecting surface is provided on one of the opposed surfaces of the terminal body portion and the pressing member;
a projecting length of the projecting surface from a non-projecting surface of the one of the opposed surfaces of the terminal body portion and the pressing member is 0.1 mm to 0.5 mm;
the projecting surface has an area that is 60% to 80% of an area of the opposed surfaces of the terminal body portion and the pressing member;
the projecting surface is a continuous surface;
the plurality of current collecting plates are each formed with through holes through which the bolts pass;
the at least one opposed surface of the terminal body portion comprises two opposed surfaces of the terminal body portion that are opposite to each other in the stacking direction;
the at least one pressing member comprises two pressing members respectively provided to face the two opposed surfaces of the terminal body portion;
a predetermined number of the plurality of tabs of the plurality of electrodes of the same polarity in the electrode group are welded to each of the plurality of current collecting plates, and the plurality of current collecting plates are divided into two groups and stacked to constitute two stacked current collecting plate groups;
one of the stacked current collecting plate groups is held in a sandwiched manner between one of the opposed surfaces of the terminal body portion and one of the pressing members, and the remaining one of the stacked current collecting plate groups is held in a sandwiched manner between the remaining one of the opposed surfaces of the terminal body portion and the remaining one of the pressing members;
the terminal body portion is formed with a plurality of through holes that each open in the two surfaces of the terminal body portion;
the two pressing members are each formed with a plurality of through holes aligned with the plurality of through holes formed in the terminal body portion;
the bolts having threaded portions at both ends are disposed to pass through the through holes formed in the terminal body portion and the through holes formed in the pressing members; and
the nuts are screwed with both ends of the bolts;
the at least one pressing member is formed from aluminum, titanium, iron, nickel, copper, zinc, silver, cadmium, or tin, and have a thickness of 5 mm to 7 mm in the stacking direction; and
the at least one pressing member, the stacked current collecting plate groups, and the terminal portion are welded to each other.

2. A terminal structure for a secondary battery including an electrode group including a plurality of electrodes each having a tab and stacked via a separator, the terminal structure comprising:
a terminal including a terminal portion and a terminal body portion; and
at least one pressing member attached to the terminal body portion using two or more fasteners each including a bolt and a nut, and configured to hold a stacked current collecting plate group in a sandwiched manner between the pressing member and the terminal body portion, the stacked current collecting plate group being formed by stacking a plurality of current collecting plates to which the tabs of the electrodes of the same polarity are welded, wherein:
the two or more fasteners are provided such that the bolts extend in a stacking direction of the current collecting plates in the stacked current collecting plate group and one or more of the fasteners are located in each of two attachment regions spaced apart at a predetermined interval;

the terminal body portion has at least one opposed surface that faces the pressing member;

the pressing member has an opposed surface that faces the terminal body portion; and at least one of the opposed surface of the terminal body portion and the opposed surface of the pressing member has a projecting surface to project toward the other of the opposed surfaces of the terminal body portion and the pressing member in a region located between the two attachment regions.

3. The terminal structure for a secondary battery according to claim 2, wherein:

the projecting surface is provided on one of the opposed surfaces of the terminal body portion and the pressing member;

a projecting length of the projecting surface from a non-projecting surface of the one of the opposed surfaces of the terminal body portion and the pressing member is 0.1 mm to 0.5 mm; and the projecting surface has an area that is 60% to 80% of an area of the opposed surfaces of the terminal body portion and the pressing member.

4. The terminal structure for a secondary battery according to claim 2, wherein the projecting surface is a continuous surface.

5. The terminal structure for a secondary battery according to claim 2, wherein:

base portions of the bolts of the fasteners are fixed to one of the terminal body portion and the pressing member;

the other of the terminal body portion and the pressing member is formed with through holes through which the bolts pass; and the nuts are screwed to threaded portions of the bolts projecting from the through holes.

6. The terminal structure for a secondary battery according to claim 2, wherein:

the pressing members are each formed with through holes through which the bolts pass; and the terminal body portion is formed with hole portions in which female threads are formed to function as the nuts when the threaded portions of the bolts are screwed into the hole portions.

7. The terminal structure for a secondary battery according to claim 2, wherein the plurality of current collecting plates are each formed with through holes through which the bolts pass.

8. The terminal structure for a secondary battery according to claim 2, wherein:

the at least one opposed surface of the terminal body portion comprises two opposed surfaces of the terminal body portion that are opposite to each other in the stacking direction;

the at least one pressing member comprises two pressing members respectively provided to face the two opposed surfaces of the terminal body portion;

a predetermined number of the plurality of tabs of the plurality of electrodes of the same polarity in the electrode group are welded to each of the plurality of current collecting plates, and the plurality of current collecting plates are divided into two groups and stacked to constitute two stacked current collecting plate groups; and one of the stacked current collecting plate groups is held in a sandwiched manner between one of the opposed surfaces of the terminal body portion and one of the pressing members, and the remaining one of the stacked current collecting plate groups is held in a sandwiched manner between the remaining one of the opposed surfaces of the terminal body portion and the remaining one of the pressing members.

9. The terminal structure for a secondary battery according to claim 8, wherein:

the terminal body portion is formed with a plurality of through holes that each open in the two surfaces of the terminal body portion;

the two pressing members are each formed with a plurality of through holes aligned with the plurality of through holes formed in the terminal body portion;

the bolts having threaded portions at both ends are disposed to pass through the through holes formed in the terminal body portion and the through holes formed in the pressing members; and the nuts are screwed with both ends of the bolts.

10. The terminal structure for a secondary battery according to claim 8, wherein:

the terminal body portion is formed with a plurality of through holes that each open in the two opposed surfaces of the terminal body portion;

the two pressing members are each formed with a plurality of through holes aligned with the plurality of through holes formed in the terminal body portion;

the bolts having a threaded portion at an end portion are disposed to pass through the through holes formed in the terminal body portion and the through holes formed in the pressing members;

base portions of the bolts contact one of the pressing members; and the nuts contact the remaining one of the pressing members.

11. The terminal structure for a secondary battery according to claim 2, wherein the at least one pressing member is formed from aluminum, titanium, iron, nickel, copper, zinc, silver, cadmium, or tin, and have a thickness of 5 mm to 7 mm in the stacking direction.

12. The terminal structure for a secondary battery according to claim 2, wherein the at least one pressing member, the stacked current collecting plate groups, and the terminal portion are welded to each other.

13. A secondary battery comprising:

a battery case including a lid plate and a case body having an opening portion blocked by the lid plate;

a positive terminal including a positive terminal portion that penetrates the lid plate and a positive terminal body portion disposed on a back surface side of the lid plate;

a negative terminal including a negative terminal portion that penetrates the lid plate and a negative terminal body portion disposed on the back surface side of the lid plate;

an electrode group formed by alternately stacking a plurality of positive electrodes and a plurality of negative electrodes via separators and housed in the case body, the plurality of positive electrodes being each formed of a positive current collector provided with a positive tab and having a positive active material layer formed thereon and the plurality of negative electrodes being each formed of a negative current collector provided with a negative tab and having a negative active material layer formed thereon;

a stacked positive current collecting plate group formed by stacking a plurality of positive current collecting plates to which the positive tabs are welded;

a stacked negative current collecting plate group formed by stacking a plurality of negative current collecting plates to which the negative tabs are welded;

a plurality of fasteners each including a bolt and a nut;

a positive pressing member attached to the positive terminal body portion using two or more of the fasteners with the stacked positive current collecting plate group held in a sandwiched manner between the positive terminal body portion and the positive pressing member; and a negative pressing member attached to the negative terminal body portion using two or more of the fasteners with the stacked negative current collecting plate group held in a sandwiched manner between the negative terminal body portion and the negative pressing member, wherein:

the fasteners are provided such that the bolts extend in a stacking direction of the positive current collecting plates in the stacked positive current collecting plate group or the negative current collecting plates in the stacked negative current collecting plate group and that one or more of the fasteners are located in each of two attachment regions spaced apart at a predetermined interval;

the positive terminal body portion and the negative terminal body portion each have an opposed surface that faces the positive pressing member or the negative pressing member;

the positive pressing member and the negative pressing member each have an opposed surface that faces the positive terminal body portion or the negative terminal body portion; and at least one of the opposed surface of the positive or negative terminal body portion and the opposed surface of the positive or negative pressing member has a projecting surface to project toward the other of the opposed surfaces in a region located between the two attachment regions.

14. The secondary battery according to claim 13, wherein:

the projecting surface is provided on one of the opposed surface of the positive or negative terminal body portion and the opposed surface of the positive or negative pressing member; and a projecting length of the projecting surface from a non-projecting surface of the one of the opposed surfaces is 0.1 mm to 0.5 mm.

* * * * *